UNITED STATES PATENT OFFICE.

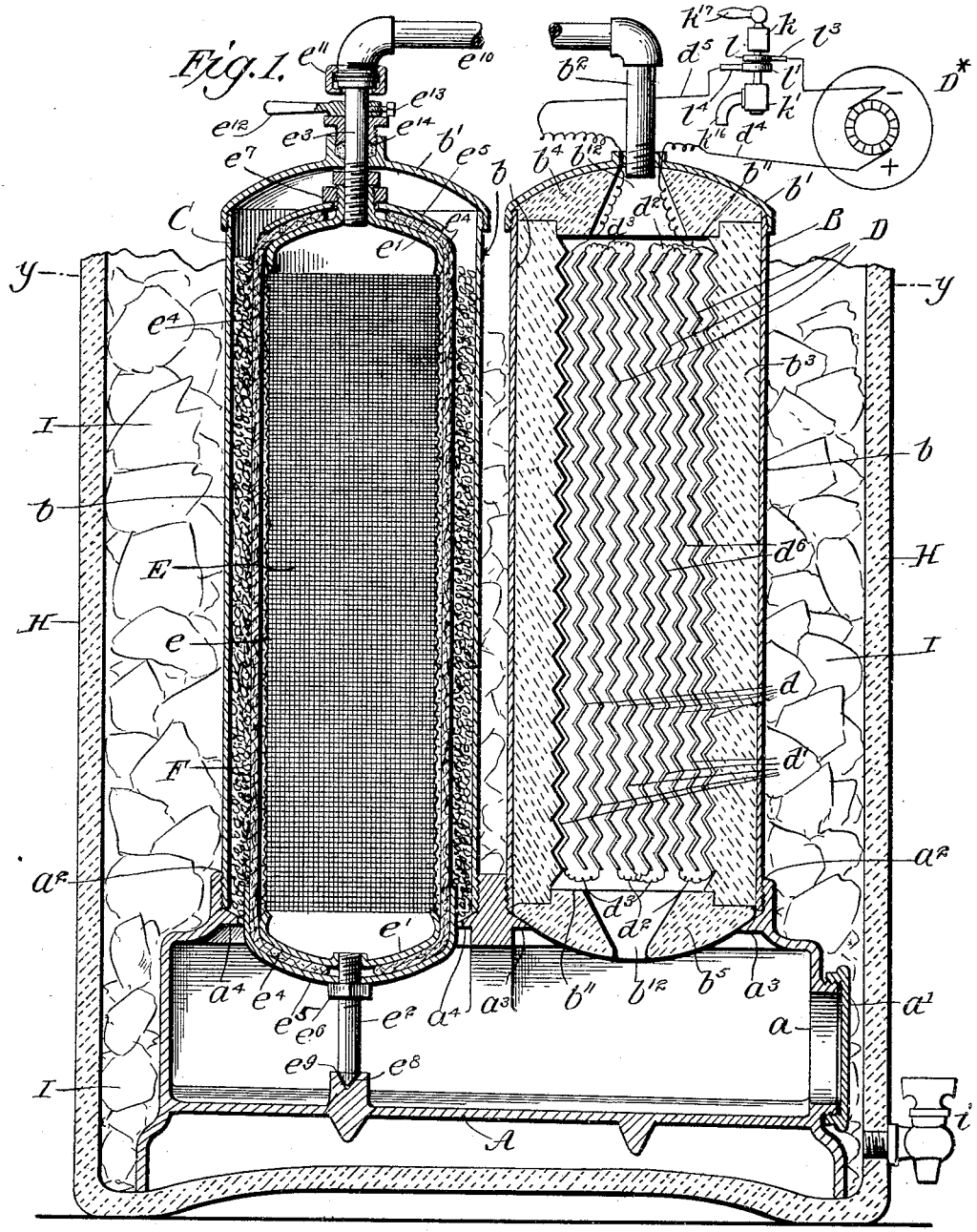

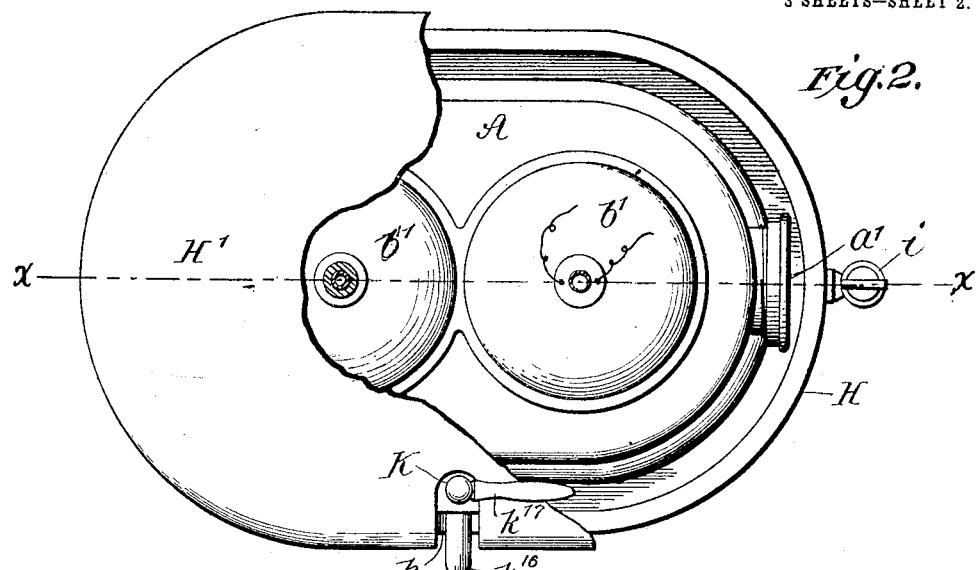
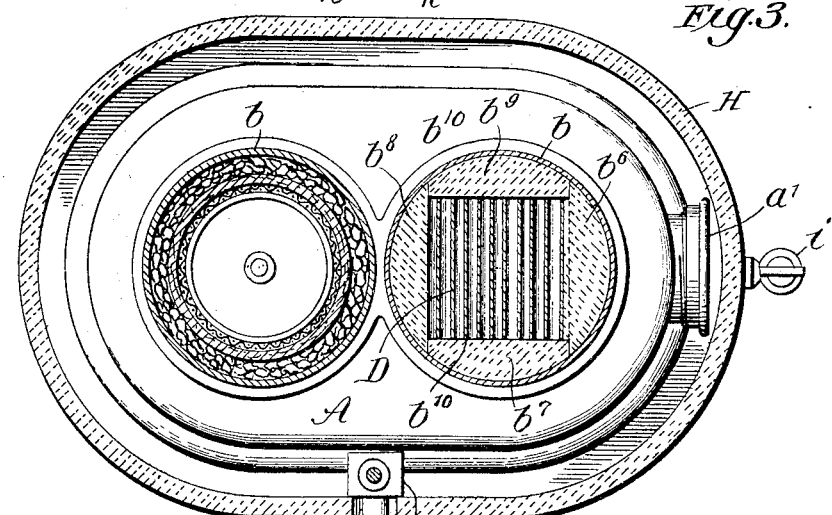
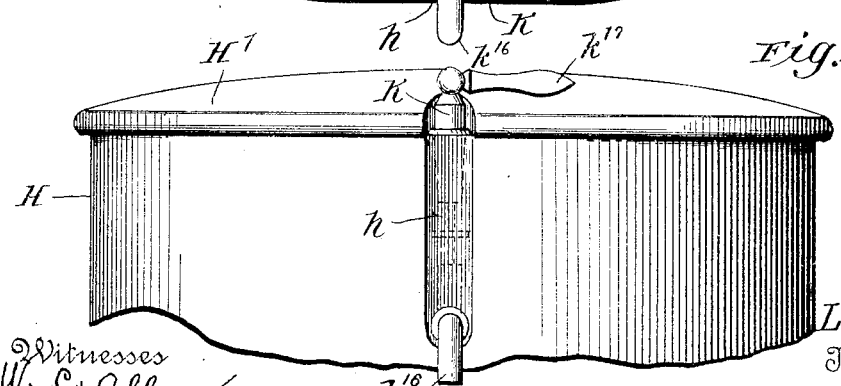

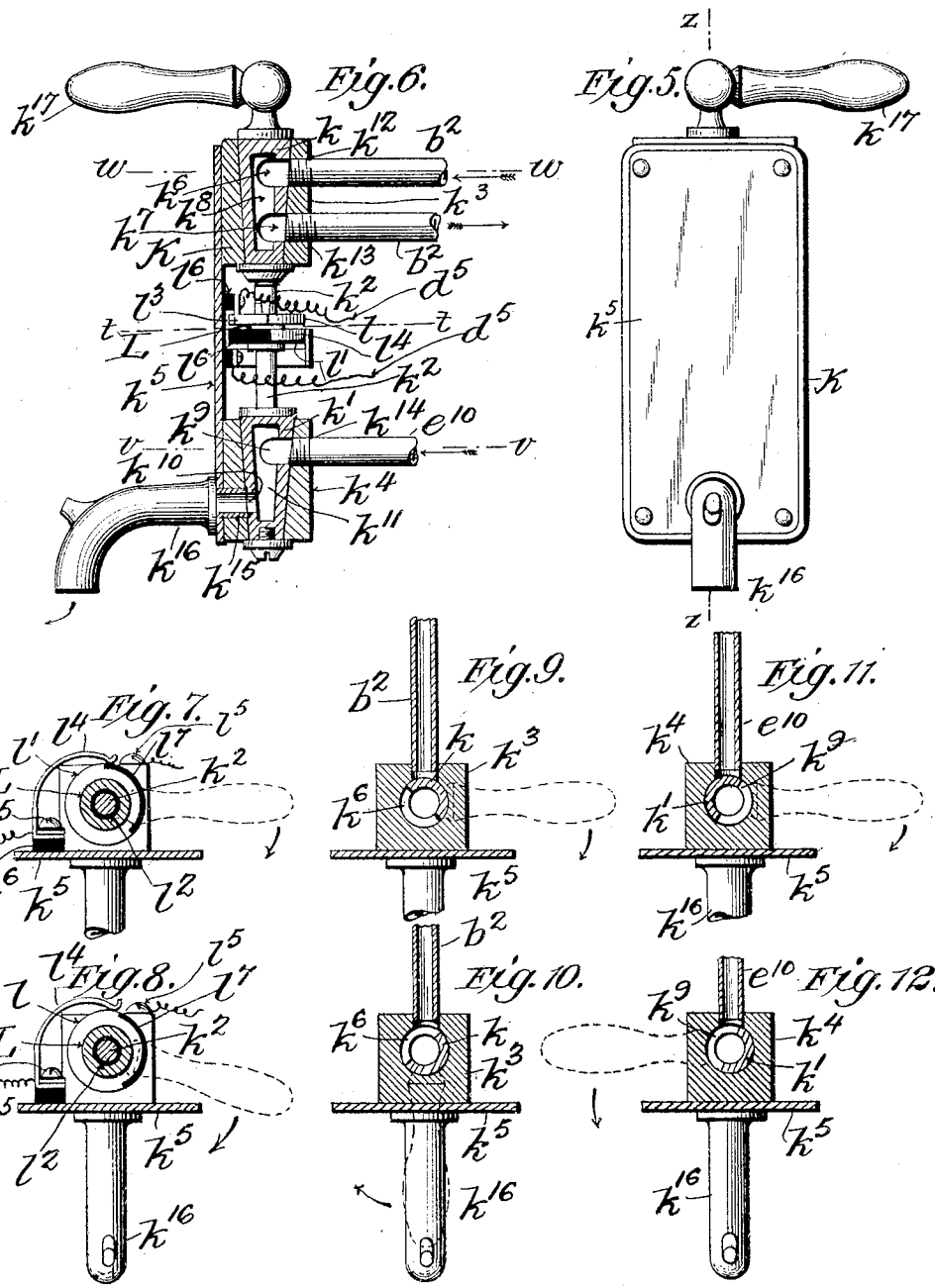

LÉON DION, OF NEW YORK, N. Y., ASSIGNOR TO THE AMERICUS ELECTRO-HERMETIC COMPANY, OF WILKESBARRE, PENNSYLVANIA, A CORPORATION OF ARIZONA TERRITORY.

APPARATUS FOR PURIFYING AND FILTERING WATER.

No. 808,350.  Specification of Letters Patent.  Patented Dec. 26, 1905.

Application filed July 29, 1904. Serial No. 218,637.

*To all whom it may concern:*

Be it known that I, LÉON DION, a citizen of the United States, and a resident of the borough of Manhattan, in the city, county, and State of New York, have invented certain new and useful Improvements in Apparatus for Purifying and Filtering Water and other Liquids, of which the following is a specification.

My invention relates to that class of apparatus in which the purification and filtration of water or other liquids are effected by first subjecting the water or other liquid to the action of an electric current and then passing it as thus acted upon through an appropriate filter or filters, the objects of the invention being to provide an apparatus of this class which while simple in construction and efficient in operation shall at the same time permit of the control and economical use of the electric current required in its operation.

To these ends the invention consists in certain peculiarities of construction and combinations of parts, all as will hereinafter more fully appear.

While my invention is capable of various embodiments and may be constructed in various forms, in the accompanying drawings, which form a part of this specification, I have shown it as adapted to the treatment of water for domestic purposes and as employed in connection with a suitable cooling agent—such, for instance, as ice.

Figure 1 is a vertical sectional elevation of the apparatus, taken in the plane $x\ x$ of Fig. 2, with parts broken away and the means for controlling the flow of the current to the electrodes and the flow of the water to and from the apparatus shown in diagrammatic elevation; Fig. 2, a plan view of the apparatus with parts broken away; Fig. 3, a horizontal section of the apparatus, taken in the plane $y\ y$ of Fig. 1; Fig. 4, a side elevation of the apparatus with the lower portion thereof broken away; Fig. 5, a front elevation of the base-plate and means by which the flow of the water or other liquid to and from the apparatus is controlled and the flow of the electric current to the electrodes regulated. Fig. 6, a vertical transverse section thereof, taken in the plane $z\ z$ of Fig. 5, with various of the parts shown in side elevation; Fig. 7, a transverse section taken in the plane $t\ t$ of Fig. 6; Fig. 8, a similar transverse section taken in the plane $t\ t$ of Fig. 6, but showing the parts in a slightly-different position; Figs. 9 and 10, horizontal sectional views taken in the plane $w\ w$ of Fig. 6, but with certain of the parts shown in slightly-different positions in the different figures; and Figs. 11 and 12, similar horizontal sectional views, taken in the plane $v\ v$ of Fig. 6, with certain of the parts also shown in different positions in the different figures.

In all the figures like letters of reference are employed to designate corresponding parts.

A indicates a tank or reservoir, which is preferably constructed in the form of a closed vessel and is provided with an opening $a$ in one of its ends, in connection with which may be applied a detachable screw-cap $a'$ or other appropriate means, whereby the opening may be closed and access to its interior permitted when it is desired to discharge the contents of the tank or reservoir or for other purposes.

Mounted upon the tank or reservoir A, so as to communicate with its interior, are chambers B and C. These chambers may be constructed in various forms, and the construction of one may be the same as that of the other or different therefrom. In the drawings, however, I have shown them as being of the same construction, with the side walls of each composed of an annular shell or casing $b$, which is threaded or otherwise secured at its lower end in a suitable orifice $a^2$, formed in the top of the tank or reservoir A, and is provided at its upper end with an inverted-cup-shaped cover or cap $b'$, threaded or otherwise secured thereon.

With the chambers B and C constructed as thus explained and mounted upon the tank or reservoir A the water or other liquid to be treated is supplied to the apparatus by a pipe $b^2$, which extends from the source of supply (not shown) to the chamber B and enters the upper end of the latter through the cap or cover $b'$.

Within the chamber B, beneath the lower end of the pipe $b^2$, is a group of electrodes D. These electrodes are composed of two series $d$ and $d'$, of which the members $d$ constitute the positive or + series and the members $d'$ constitute the negative or − series. In the construction of these electrodes various forms may be adopted. I prefer, however, to construct them in the form of plates and to arrange them in vertical positions within the chamber B, with the members of the negative or − series $d'$ interposed between and alternating with the members of the positive or + series $d$, as shown. As thus arranged the members of the positive or + series $d$ are all connected the one with the other by appropriate conductors $d^2$, while the members of the negative or − series $d'$ are similarly connected by conductors $d^3$ with the positive and negative series as thus separately united, connected with the respective positive and negative poles of the dynamo $D^*$ or other source of electric supply by conductors $d^4$ and $d^5$. With the electrodes thus constructed and arranged these electrodes receive the water or other liquid supplied to the chamber B through the pipe $b^2$ upon their upper ends and allow of its flowing downward along and between the members thereof to the tank or reservoir A below. In thus passing downward between the electrodes D the water or other liquid serves to establish an electric circuit between them, by which means the water or other liquid is subjected to the action of an electric current when there is an output of such current from the dynamo or other source of electric supply, and in order to retard the flow of the water or other liquid when passing downward between the electrodes and cause it to impinge against their surfaces during such transit the members of these latter are preferably provided with transversely-arranged V-shaped corrugations $d^6$, extending across them from their upper to their lower ends, whereby the passage-ways downward between the electrodes instead of being left straight are rendered sinuous. The chamber B being thus equipped with the electrodes D is provided on its interior with an electricity-nonconducting lining $b^3$, whereby it is insulated and the loss of the electric current supplied to the water or other liquid through the electrodes prevented. This lining $b^3$ may be composed of various materials, but is preferably of a character that is neither active upon nor is itself affected by the water or other liquid that is undergoing treatment and may, if so desired, be applied to the interior of the chamber B in such a manner as to present a continuous and unbroken surface throughout or otherwise. I prefer, however, to form this lining from clay, porcelain, or other similar material, properly baked and glazed, with the top $b^4$ and the bottom $b^5$ constructed as separate and detachable parts and the side walls made up from sections $b^6$, $b^7$, $b^8$, and $b^9$. When this form of construction is employed, the sections composing the side walls are in cross-section preferably of the contour of segments of a circle and are of such dimensions that when assembled in the outer shell $b$ of the chamber B a square compartment $b^{10}$, extending from the top to the bottom of the chamber, is formed for reception of the electrodes D, with the edges of the sections $b^6$ and $b^8$ extending past and across the edges of the sections $b^7$ and $b^9$. The top $b^4$ and bottom $b^5$ of this lining, on the other hand, are preferably constructed in the form of plano-convex disks, with each provided with a rectangular portion $b^{11}$, projecting slightly from its plane face, and with an orifice $b^{12}$ for the passage of the water or other liquid extending axially through the same and of a gradually-increasing diameter from its outer to its inner end, as shown. As thus constructed the top part $b^4$ is arranged within the detachable cap or cover $b'$ and rests upon the top of the segmental sections $b^6$, $b^7$, $b^8$, and $b^9$, with the rectangular portion $b^{11}$ projecting downwardly into and closing the top of the compartment $b^{10}$ and the orifice $b^{12}$ therein registering with the pipe $b^2$, while the bottom part $b^5$ rests against the bottom of the segments $b^6$, $b^7$, $b^8$, and $b^9$ within the orifice $a^2$, formed in the top of the tank or reservoir A, with the rectangular portion $b^{11}$ thereon projecting upwardly within and closing the bottom of the compartment $b^{10}$, in which position the part $b^5$ is held by an annular flange $a^3$, projecting inwardly from the walls of the orifice $a^2$ beneath the same, as shown.

With the interior of the chamber B equipped with an insulating-lining, as above explained, and with the location of the electrodes D within the compartment $b^{10}$ not only is the escape of the electric current supplied to the electrodes prevented, but the contact of the water or other liquid with the metal of the chamber, and its consequent contamination, obviated, and in order to insure of the water or other liquid passing downward between the members of the electrodes and of being acted upon by the electric current in passing between them the outer members of the series $d$ and $d'$ are embedded, respectively, in the faces of the sections $b^6$ and $b^8$, whereby to prevent the passage of any of such water or other liquid between them and the lining, as shown. In thus passing downward along and between the electrodes D and being subjected to the action of an electric current in its transit all metals and other impurities contained within the water or other liquid will be separated out from it thereby and concentrated and with it in suspension will flow downward, through the orifice $b^{12}$ in the bottom part $b^5$ of the lining, into the tank or reservoir A, where these metals and other substances will gradually subside and may be removed therefrom when desired, through the orifice $a$, by removing the screw-cap $a'$ from the latter.

From the tank or reservoir A the water or other liquid passing downward through and delivered by the chamber B rises in the chamber C, where it is freed from all particles of metals or other substances held in suspension therein and thence passes upward through the same to the place of discharge. For freeing the water or other liquid from these particles I make use of a filter E. This filter may be of any ordinary or preferred construction. As here shown, however, it is composed of a cylindrical body $e$, which is somewhat less in diameter than the interior of the chamber C and is formed from any suitable foraminated or reticulated material with segmental spherical ends $e'$ applied thereto, which are or may be formed from imperforate material, if so desired. As thus constructed this body $e$, with its ends $e'$, is supported upon a vertical axis within the chamber C by a short shaft or stud $e^2$, which is or may be threaded at its upper end in the bottom end $e'$ of the body $e$ and is sustained at its lower end from the bottom of the tank or reservoir A, while from the top end $e'$ of this body $e$ extends an outlet-pipe $e^3$, which is or may be threaded at its lower end therein and is connected at its own upper end with a similar pipe $e^{10}$, which leads to the place of discharge. The body $e$, with its ends $e'$, being thus supported within the chamber C has applied to its exterior a layer of filtering material $e^4$, through which the water or other liquid is passed and the separation of all particles of metals or other foreign substances therefrom effected. This filtering material may be of various kinds. I prefer, however, to employ felt for the purpose and to apply it not only over the foraminated or reticulated cylindrical portion $e$, but over the imperforate ends $e'$ thereof, and to hold it firmly in that relationship by segmental spherical clamping members $e^5$, which are held firmly clamped against the respective top and bottom ends $e'$ by nuts $e^6$ and $e^7$, of which the nut $e^6$ engages with the threaded portion of the short shaft or stud $e^2$ and coöperates with the lower clamping member, while the nut $e^7$ similarly engages with the threaded portion of the outlet-pipe $e^3$ and coöperates with the upper clamping member, as shown.

With the filter constructed and arranged as above explained the water or other liquid rising in the chamber C will pass through the filter and thence flow upward through the outlet-pipe $e^3$ to the place of discharge. In thus passing through the filter any particles of metal or other foreign substance contained in the water or other liquid and held in suspension will be arrested by the filter-covering $e^4$ as such water or other liquid passes therethrough, and such covering in time become more or less clogged by them unless provisions are made for their removal. In order therefore, to obviate this clogging, I employ means whereby the particles as they accumulate may be removed from such covering and the latter renovated from time to time. These means in my preferred form of construction consists of a loose mass F of material which is more or less finely divided and which is interposed between the exterior of the filter-covering $e^4$ and the interior of the chamber C, in which position it is held by an annular flange $a^4$, projecting inwardly beneath it from the walls of the orifice $a^2$, with the inner edge of this flange extended inwardly in such close relationship to the exterior of the filter as to leave only a narrow space between them.

The finely-divided material employed as the cleaning medium may be composed of loose masses of small broken stone or other hard material. I prefer, however, to employ small pebbles for the purpose; but whatever its nature the separate constituents will be sufficiently large as to be incapable of passing downwardly through the space between the filter and the inner edge of the inwardly-projecting flange $a^4$ in the orifice $a^2$. The cleaning material being thus arranged and being in contact with the exterior of the covering $e^4$ of the filter, the cleaning of this covering will be effected by carrying it past the stationary cleaning material, which may be done by imparting a rotary motion to the filter upon its axis. To permit of this being accomplished, the lower end of the short shaft or stud $e^2$ is formed as a step $e^8$ and rests in an appropriate step-bearing $e^9$, supported upon the bottom of the tank or reservoir A, while the outlet-pipe $e^3$ instead of extending to the place of discharge is so united at its upper end with a similar pipe $e^{10}$, leading to that destination, by a coupling $e^{11}$ as to be capable of rotation thereon. As thus arranged the rotation of the filter in the cleaning material when desired may be effected by any convenient means. In the form of the invention shown in the drawings, however, it is effected by a handle $e^{12}$, which is fixedly secured to the outlet-pipe $e^3$ by a set-screw $e^{13}$, and in order to prevent the escape of the water or other liquid around this pipe, while yet allowing of the rotation of the pipe within the cap or cover $b'$, this cap or cover instead of having the pipe fixedly secured therein is provided with a stuffing-box $e^{14}$, through which the pipe passes and in which it may be rotated as required.

The tank or reservoir A, with its connected chambers B and C and their various accessories, may be used alone to purify water or other liquids or be employed in connection with other appliances. I prefer, however, to employ them in connection with cooling means, whereby in addition to the purification of the water or other liquid passing through them this water or other liquid may be cooled at the same time. To permit of this being accomplished, I make use of an inclosing vessel or casing H, in which the several parts thus far described may be arranged. This vessel or casing may be constructed of any appropriate material. I prefer, however, to construct it of clay, porcelain, or earthenware properly baked and glazed and of a general oval form in horizontal cross-section, with its interior dimensions somewhat greater than that of the parts which are arranged within it and the same provided with a detachable cap or cover H', whereby access to its interior may be had when desired. As thus constructed this vessel or casing H receives the tank or reservoir A, with its connected chambers B and C, which are placed therein, and these several parts surrounded by ice I, which may be packed within the vessel or casing H around them. With the tank or reservoir A and the chambers B and C thus surrounded by ice in the vessel or casing H and proper electrical connections between the electrodes D and the source of electric supply established not only is the water or other liquid supplied through the pipe $e^2$ and passed downward between the electrodes D into the tank or reservoir A, acted upon by the electric current and the metals or other impurities contained in it separated out therefrom and concentrated, but the water or other liquid thus treated relieved of all particles of metal or other impurities held in suspension in passing upward through the filter and at the same time cooled preparatory to passing to the point of discharge. While thus the purification and cooling of the water or other liquid is effected by passing it through the apparatus, any water resulting from the melting of the ice I in the vessel or casing H may be removed therefrom by simply opening the valve or faucet $i$ with which the vessel or casing is provided.

For permitting of the withdrawal of the water or other liquid from the apparatus and controlling the flow thereof various forms of mechanism may be employed. I prefer, however, to adopt for this purpose appliances whereby when the water or other liquid is withdrawn from the apparatus a fresh supply of such material will be furnished thereto, and when, on the other hand, the flow of water or other liquid therefrom is arrested the supply thereto shall be interrupted. To permit of this being accomplished, I preferably make use of a double valve or faucet K, which is provided with two tapering plugs $k$ and $k'$, that are mounted the one above the other upon a common axis $k^2$ and respectively fitted to rotate in correspondingly-shaped seats $k^3$ and $k^4$, secured to or formed integrally with a plate $k^5$. As thus constructed the plug $k$ is provided with two elongated ports $k^6$ and $k^7$, which are arranged the one above the other in a vertical line and connected at their inner ends by a chamber or recess $k^8$, extending between them, while the plug $k'$ is similarly provided with two ports $k^9$ and $k^{10}$, which are disposed on opposite sides of the axis thereof, with the port $k^9$ elongated and connected at its inner end with the inner end of the diametrically opposite port $k^{10}$ by a chamber or recess $k^{11}$. With the plugs $k$ and $k'$ thus provided with their respective ports the seats $k^3$ and $k^4$ of these plugs are respectively provided with corresponding ports $k^{12}$ and $k^{13}$ and $k^{14}$ and $k^{15}$, which are preferably arranged with their axes in approximately the same vertical plane. As thus equipped this valve K is located intermediate of the ends of the pipe $b^2$, with the outer discharging end of the section thereof, which leads from the water or other liquid supply, secured in the port $k^{12}$ and with the outer end of the section of this pipe which leads from the valve K to the interior of the chamber C secured in the port $k^{13}$. The sections of the pipe $b^2$ being thus connected with the respective ports $k^{12}$ and $k^{13}$, the outer end of the pipe $e^{10}$, leading from the chamber C, is connected with the port $k^{14}$, while the port $k^{15}$ in like manner receives and has connected with it the inner end of a discharging-nozzle $k^{16}$. With the valve K constructed and connected as thus explained this valve may be located at any convenient point upon the vessel or casing H. In the drawings, however, I have shown it as disposed within a recess $h$, formed in the upper portion of the front of the vessel or casing H, with the axis $k^2$, upon which the plugs $k$ and $k'$ are supported, provided with a suitable handle $k^{17}$, by means of which the rotation of the plugs may be effected when desired. When thus located and the parts are in the positions shown in Figs. 5 and 7, which are their normal positions, the imperforate walls of the plugs $k$ and $k'$ will extend across the inner ends of the pipes and discharge-nozzle in the respective ports $k^{12}$, $k^{13}$, $k^{14}$, and $k^{15}$ and the flow of water or other liquid from and to the apparatus thereby prevented. When, on the other hand, it is desired to discharge the water or other liquid from the apparatus, then the handle $k^{17}$ will be swung around toward the front of the machine through the arc of ninety degrees and the ports $k^6$ and $k^7$ in the plug $k$ will be brought opposite the respective inner ends of the two sections of the pipe $b^2$, as shown in Figs. 6 and 10, when the water or other liquid from the source of supply will be free to flow through the plug $k$ and enter the chamber B, where it will be discharged upon the upper ends of the electrodes D, while the inner end of the pipe $e^{10}$ in the port $k^{14}$ will remain closed. From this position the handle $k^{17}$ will be turned through a further arc of ninety degrees and the port $k^9$ in the plug $k'$ will be brought opposite the end of the pipe $e^{10}$ in the port $k^{14}$ and the port $k^{10}$ in the plug $k^2$ brought opposite the inner end of the discharge-nozzle $k^{16}$ in the port $k^{15}$, as shown in Fig. 12, when the flow of the water or other liquid from the apparatus will be allowed through the discharge-nozzle $k^{16}$, while the supply thereto in consequence of the length of the ports $k^6$ and $k^7$ is continued. The required amount of water or other liquid having been withdrawn from the apparatus, the ports $k^{12}$, $k^{13}$, $k^{14}$, and $k^{15}$ will be closed by swinging the handle $k^{17}$ back into the position it originally occupied, or that shown in Figs. 5 and 7, when the imperforate walls of the plugs $k$ and $k'$ will be carried back across the ends of the various pipes and the respective ports in which these pipes are secured and the flow of the water or other liquid to and from the apparatus thereby suspended. In this position the parts will remain until it is desired to withdraw a further amount of water or other liquid from the apparatus, when the handle $k^{17}$, with the parts connected with it, will be carried into the position above explained, and so on.

While thus equipped with means for controlling the flow of water or other liquids from and to it, this apparatus is also provided with means whereby the flow of the electric current from the dynamo $D^*$ or other source of supply to the electrodes D is interrupted, when the flow of the water or other liquid from and to it is suspended and such electric current caused to flow through the electrodes when the water or other liquid is being supplied to and withdrawn from the apparatus. The means whereby this control of the electric current is effected may be of various kinds. In the form selected by me for purposes of illustration, however, it consists of a hub L, which is constructed of some material that is a good conductor of electricity and is provided with two disks $l$ and $l'$, which are formed from the same material as the hub and are fixedly secured thereto or made integrally therewith. As thus constructed this hub, with the disks $l$ and $l'$ thereon, is fixedly secured upon the axis $k^2$ of the valve or faucet K, from which it is properly insulated by a non-conducting bushing $l^2$, and coöperates with two brushes $l^3$ and $l^4$, which, secured to the face-plate $k^5$ by appropriate screws $l^5$, and insulated therefrom by insulating-strips $l^6$ interposed between them, are respectively connected with the dynamo $D^*$ or other source of electric supply and with the electrodes D through the conductors $d^5$, in which they are arranged. With the brush $l^3$ thus connected with the dynamo or other source of electric supply through one section of the conductor $d^5$ and the brush $l^4$ connected with the electrodes D through the other section thereof a circuit is formed between the dynamo or other source of electric supply and the electrodes, and whenever there is an output of current from the former it will pass through the latter. In order therefore to interrupt the flow of this electric current when no water or other liquid is being withdrawn from and supplied to the apparatus, I provide one of the disks—as, for instance, $l'$—with an electricity-non-conducting surface $l^7$, which is made of such length and is so disposed upon the periphery of the disk $l'$ that when the valve or faucet K is in position to prevent the flow of water or other liquid from and to the apparatus this non-conducting surface $l^7$ will be interposed beneath the brush $l^4$, but be removed from beneath the same when such valve or faucet is so turned as to permit of the withdrawal of the water or other liquid from the apparatus and its supply thereto. When thus interposed beneath the brush $l^4$, this non-conducting surface breaks the electric circuit in which the electrodes D are arranged and no electric current is supplied to the latter from the dynamo or other source of supply. On the other hand when this non-conducting surface is withdrawn from beneath the brush $l^4$ by turning the valve or faucet K the electric circuit is established and the current from the dynamo or other source of electric supply flows through such electrodes and continues to flow through them as long as the circuit in which they are arranged remains unbroken and there is an output of current from the source of supply. In order therefore to provide for the making of this electric circuit whenever there is a withdrawal of the water or other liquid from and a supply of the same to the apparatus and a breaking of the circuit when such withdrawal and supply of water or other liquid are discontinued, the non-conducting surface $l^7$ is so applied to the periphery of the disk $l'$ that when the various ports in the seats $k^3$ and $k^4$ are closed and the valve or faucet K, with its operating-handle $k^{17}$, is in the position shown in Figs. 5 and 7 the rear end of the non-conducting surface is under the brush $l^4$ and the electric circuit, as before explained, is broken. Immediately, however, the handle $k^{17}$ is turned in the direction of the arrow in Fig. 7 to withdraw the water or other liquid from the apparatus or otherwise the non-conducting surface $l^7$ will be withdrawn from beneath the brush, as shown in Fig. 8, when the electric circuit will be established and continued so long as the withdrawal of the water or other liquid from and to the apparatus is desired. The required amount of water or other liquid having been withdrawn and supplied to the apparatus, the further flow of such water or other liquid and the flow of the electric current to the electrodes D will be suspended by turning the handle $k^{17}$ of the valve or faucet K backward into the position it initially occupied or into that shown in Figs. 5 and 7 when the various ports in the seats $k^3$ and $k^4$ will first be closed and the rear end of the non-conducting surface $l^7$ on the disk $l'$ then carried beneath the brush $l^4$, as shown in Fig. 7, thereby cutting off the flow of the water or other liquid and breaking the electric circuit in which the electrodes are located. Thus with the parts constructed as above explained not only is the flow and interruption of the water or other liquid from and to the apparatus controlled, but the flow and interruption of the electric current to the electrodes D in correspondence thereto regulated as well.

From the foregoing it will thus be seen that I produce a simple and convenient apparatus in which the water or other liquids are not only subjected to the actions of an electric current and to a filter, with the result that all metals and other foreign substances contained in it are concentrated and removed, but such water or other liquid at the same time subjected to the action of a cooling agent, and thereby cooled.

While in the drawings I have shown and in the above described the best means contemplated by me for carrying my invention into practice, I wish it distinctly understood that I do not limit myself strictly thereto, but reserve to myself the right to modify the same in various ways without departing from the spirit of such invention. Again, while in the drawings I have shown and in the foregoing described a particular form of mechanism for controlling the flow of the electric current to the electrodes and the flow of the water or other liquid to and from the apparatus and have likewise shown and described in them special means by which the surface of the filter may be cleaned when desired I make no claim to this mechanism and to these means herein when separately considered, as they severally form the subjects of separate applications, which were filed by me in the United States Patent Office March 25, 1905, and respectively numbered 252,070 and 252,071.

Having now described my invention and specified one of the various forms in which it is or may be carried into practice, I claim and desire to secure by Letters Patent of the United States—

1. The combination, with a closed tank or reservoir, two chambers mounted upon it and connected with its interior, an insulating-lining arranged within one of these chambers and made up from independent sections and parts, and a filter arranged within the other of such chambers, of a group of electrodes arranged within the compartment formed by such insulating-lining, means by which a current of electricity may be supplied to these electrodes, means by which water or other liquid may be supplied to and the purified portion thereof withdrawn from the apparatus, and devices by which this flow of the water or other liquid to and from the apparatus may be controlled, and which, when operated to allow of the withdrawal of the water or other liquid from the apparatus, also allows of the flow of the water or other liquid thereto; substantially as described.

2. The combination, with a plurality of chambers, a passage-way by which they are connected, an insulating-lining arranged in one of these chambers and made up from independent sections and parts, and a filter arranged within a different chamber, of a group of electrodes arranged within the said insulating-lining, means by which an electric current may be supplied to these electrodes, means by which water or other liquid may be supplied to and the purified portion of it withdrawn from the apparatus, and devices by which this flow of the water or other liquid to and from the apparatus, and the flow of the electric current to the electrodes, may be respectively controlled, and which, when operated to allow of the withdrawal of the water or other liquid from the apparatus, also allows of the electric current flowing to the electrodes and the flow of the water or other liquid to such apparatus; substantially as described.

3. The combination, with a closed tank or reservoir, two closed chambers mounted upon this tank or reservoir and communicating with its interior, a group of electrodes and a filter with which these chambers are respectively provided, and an insulating-lining surrounding the electrodes within the chamber containing them and made up from independent sections and parts, of a vessel or casing in which the said parts may be arranged and subjected to the action of a cooling agent, mechanism for supplying a current of electricity to the electrodes, means by which water or other liquid may be supplied to and withdrawn from the apparatus, and devices by which this flow of the water or other liquid to and from the apparatus and the flow of the electric current to the electrodes may be respectively controlled, and which, when operated to allow of the withdrawal of the water or other liquid from the apparatus, shall also allow of the electric current flowing to the electrodes, and the flow of the water or other liquid to the apparatus in that sequence before its withdrawal therefrom; substantially as described.

4. The combination, with a chamber provided with an insulating-lining, a group of electrodes arranged within this chamber, a second chamber having its interior communicating with the interior of the first-mentioned chamber, a filter arranged within this second chamber, and means through which an electric current may be supplied to the electrodes, of an inlet-pipe through which water or other liquid may be supplied to the chamber containing the electrodes, a discharge-nozzle connected with the chamber containing the filter for conveying and discharging such water or other liquid therefrom, and means by which, in its operation in one direction, the circuit in which the electrodes are arranged will first be established and the electric current allowed to flow through them, the flow of the water or other liquid to the chamber in which the electrodes are located next permitted, and then the discharge of the water or other liquid from the apparatus allowed, while in its operation in the opposite direction the discharge of the water or other liquid from the apparatus will first be interrupted, the flow of the water or other liquid to the chamber containing the electrodes next suspended, and lastly the electric circuit in which the electrodes are arranged will be broken and the flow of the current to such electrodes thereby terminated, substantially as described.

5. The combination, with the chamber B, the inlet-pipe leading thereto, the filter, the discharge-pipe leading therefrom, the electrodes, a source of electric supply, conductors leading from the source of supply to the electrodes, and a discharge-nozzle, of a valve-plug provided with two ports adapted to coöperate with the incoming and outgoing ends of the inlet-pipe and connected at their own inner ends, a second valve-plug arranged to rotate around and with the axis of the first-mentioned valve-plug and provided with two ports which are similarly connected at their inner ends and are adapted to coöperate with the respective end of the outlet-pipes and the discharge-nozzle, two disks mounted upon and adapted to move with and around the axis upon which the valve-plugs are moved, with one of these disks provided with a non-conducting surface throughout a portion of its periphery, brushes for coöperating with these disks, conductors by which these brushes are respectively connected with a source of electric supply and with the electrodes, and a device by which the movement of the plugs and disks around their common axis may be effected, whereby when the plugs are moved around their common axis in one direction to a given extent the water or other liquid will be free to enter and flow from the apparatus and an electric circuit between the source of electric supply and the electrodes will be established, and when moved in the opposite direction the flow of the water or other liquid to and from the apparatus will be suspended and the electric circuit broken, substantially as described.

In witness whereof I have hereunto set my hand this 25th day of July, 1904.

LÉON DION.

Witnesses:
    WM. H. APPLETON,
    W. C. HAUFF.